April 15, 1941.   E. WEISHAAR   2,238,840
SWEEP RAKE
Filed May 6, 1940   3 Sheets-Sheet 2
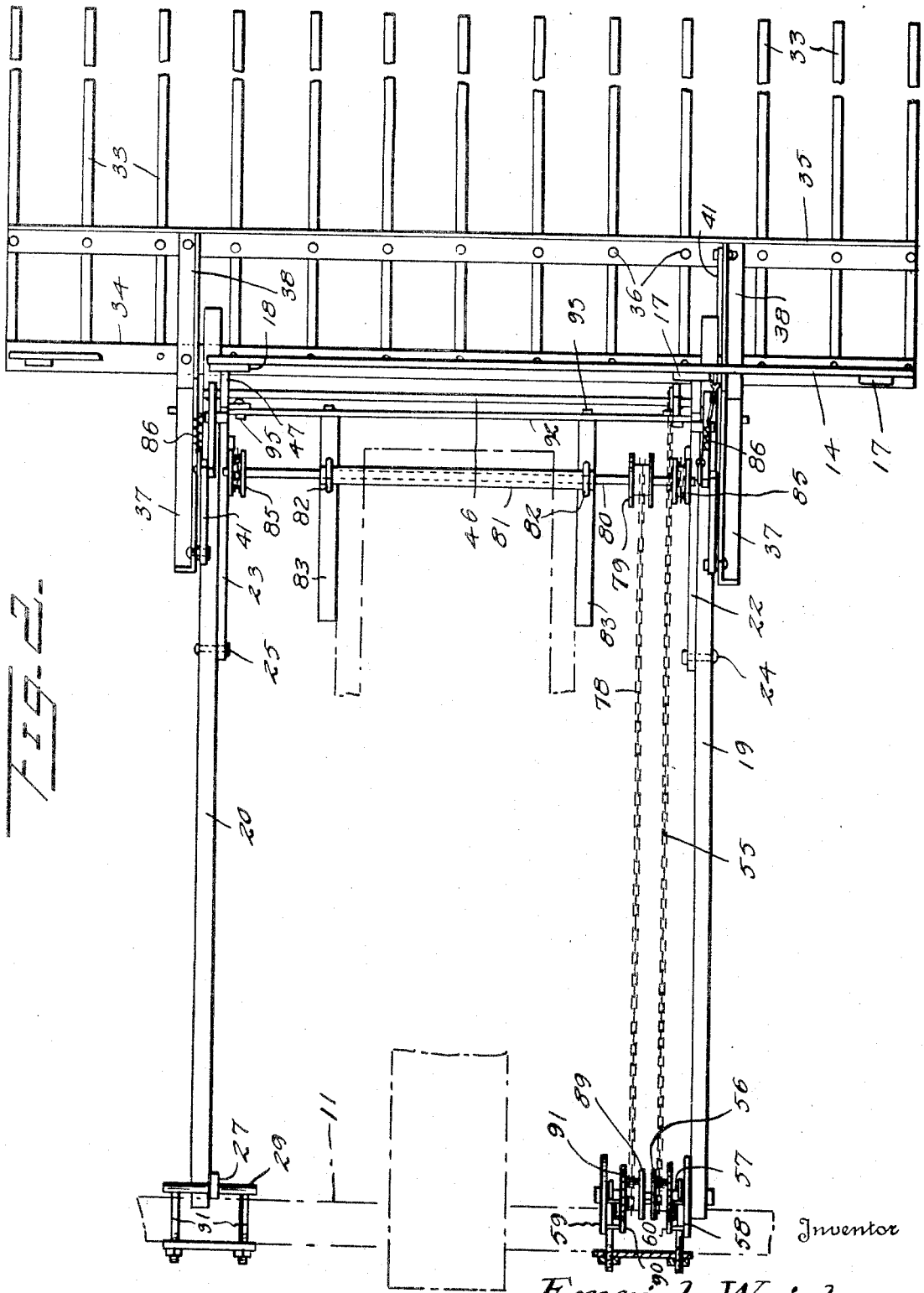
Inventor
Emrich Weishaar
By Kimmel & Crowell
Attorneys April 15, 1941.  E. WEISHAAR  2,238,840

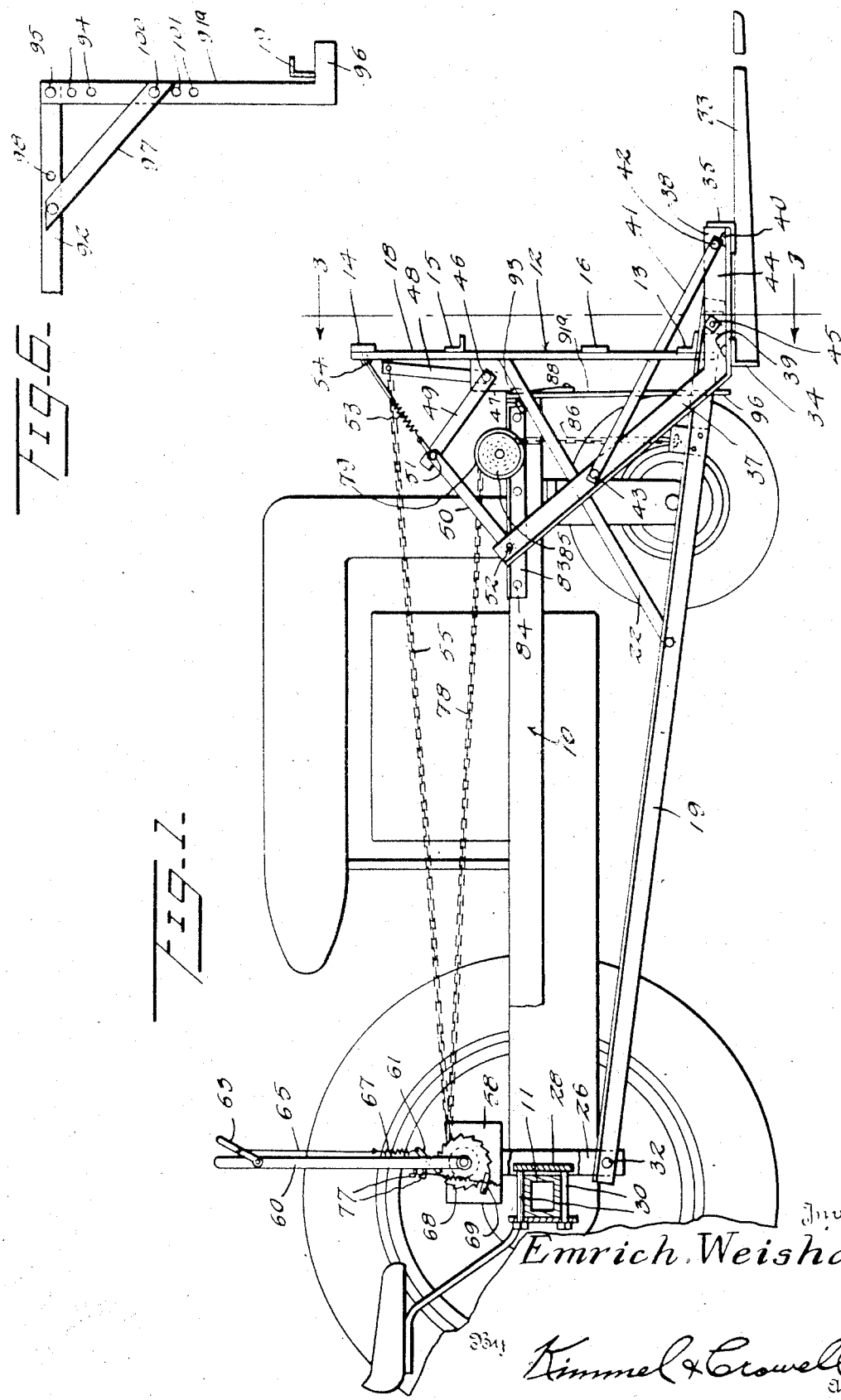

SWEEP RAKE

Filed May 6, 1940  3 Sheets-Sheet 3

Inventor
Emrich Weishaar

By Kimmel & Crowell
Attorneys

Patented Apr. 15, 1941

2,238,840

UNITED STATES PATENT OFFICE 2,238,840

SWEEP RAKE

Emrich Weishaar, Ashton, Ill.

Application May 6, 1940, Serial No. 333,682

10 Claims. (Cl. 56—27)

This invention relates to sweep rakes and more particularly to a rake of this type which is adapted to be removably secured to a tractor.

An object of this invention is to provide an improved sweep structure which is so constructed that the elevating or lowering of the structure may be effected by a pendulum action of a raising or lowering lever structure.

Another object of this invention is to provide a rake structure of this kind including a supporting frame which is pivotally secured at its rear to the rear of the tractor and which has fixedly secured thereto a back wall of the rake and in addition has pivotally secured thereto a tine structure so that when desired, the tine structure may be rocked independent of the rocking of the frame structure.

A further object of this invention is to provide a sweep structure of this kind including an improved elevating or lowering structure which is operable in a step by step movement so that when it is, as an example, desired to lower the sweep structure, the elevating or lowering means may be released so as to permit a gradual lowering of the sweep, and in this manner, prevent sudden dropping of the sweep structure relative to the tractor.

A still further object of this invention is to provide a sweep structure of this kind which is simple in construction and which is relatively light in weight.

To the foregoing objects and to others which may hereinafter appear, the invention consists of the novel construction, combination and arrangement of parts as will be more specifically referred to and illustrated in the accompanying drawings wherein are shown embodiments of the invention, but it is to be understood that changes, variations and modifications may be resorted to which fall within the scope of the invention as claimed.

In the drawings:

Figure 1 is a detail side elevation partly broken away and in section of a sweep structure mounted on a tractor.

Figure 2 is a detail top plan partly in section of the sweep structure.

Figure 3 is a fragmentary sectional view taken on the line 3—3 of Figure 1.

Figure 4 is an enlarged detail side elevation partly in section of the sweep elevating and lowering structure showing this structure in locked position.

Figure 5 is a view similar to Figure 4 but showing the elevating and lowering structure in a released position to permit automatic lowering of the sweep.

Figure 6 is a fragmentary front elevation of the sweep steadying means.

Referring to the drawings, the numeral 10 designates generally the frame of a tractor which is provided at its rear with a transversely disposed axle housing 11. A substantially vertically disposed back wall generally designated as 12 for a sweep rake is disposed forwardly of the frame structure 10 of the tractor, and this wall structure 12 comprises a lower horizontally disposed angle bar 13, an upper horizontally disposed bar 14 and a pair of intermediate bars 15 and 16, which are disposed parallel to the upper and lower bars 13 and 14. The horizontal bars 13, 14, 15 and 16 are secured together by means of a plurality of vertical frame members 17 and 18, which are secured to the horizontal bars as by rivets, welding or the like.

A pair of rearwardly projecting push bars 19 and 20 are secured as by fastening devices 21 to the lower frame member 13 and project rearwardly of the uprights 17 and 18 at a substantially acute angle. The push bars 19 and 20 are braced relative to the wall structure 12 by means of a pair of braces 22 which at their lower rear ends are secured as by fastening devices 24 and 25 to the push bars 19 and 20, respectively. The forward upper ends of the braces 22 and 23 may be welded or otherwise secured to the uprights 17 and 18 by welding or other suitable fastening means.

Supporting brackets 26 and 27 are secured to a pair of vertically disposed plates 28 and 29, which engage against the forward side of the axle housing 11, and the plates 28 and 29 are removably secured to the housing 11 by bolts 30 and 31, respectively. The brackets 26 and 27 depend below the housing 11, and the rear ends of the push bars 19 and 20 are pivotally secured to the brackets 26 and 27 by pivotal members 32.

A rake or sweep structure is pivotally secured to the forward ends of the push bars 19 and 20, and this rake structure comprises a plurality of parallel projecting tines 33 which at their rear ends are secured to a rear angle member 34. An angle member or brace 35 is secured as by fastening devices 36 to the tines 33 forwardly of the rear angle member 34. A rake pivoting lever comprising an upwardly and rearwardly directed arm 37 and an obtusely disposed forwardly projecting arm 38 is fixedly secured to the angle members 34 and 35 by fastening devices 39 and 40. There are two of these rake levers, one on each side of the tractor frame 10 and preferably a bracing bar 41 connects the lower forward arm 38 with the rearwardly and upwardly directed arm 37. The brace 41 is fixed at its lower forward end as at 42 to the vertical side of the angle arm 38 and the rear upper end of the brace 41 is fixed as at 43 to the rear upwardly directed arm 37 at a point upwardly from the angle formed between the two arms 37 and 38. The vertical side 44 of the arm 38 is pivotally secured as by a pivot member 45 to a push bar so that rocking of the lever structure including the two arms 37 and 38 will pivotally swing the tines 33 relative to the push bars 19 and 20.

A transversely disposed rock shaft 46 is rotatably disposed in a pair of bearings or plates 47 which are fixed to the uprights 17 and 18, respectively, on the rear sides of these uprights and the rock shaft 46 has fixed thereto a lever or operating arm 48 which extends upwardly of the shaft 46. A second lever or crank arm 49 is fixed to the rock shaft 46 and in practice there are two of these arms 49, one adjacent each side of the tractor frame 10, and the crank arms 49 are disposed at an acute angle to the arm 48. A connecting link 50 connects a crank arm 49 with the upper rear end of a lever arm 37, the link 50 being pivotally connected as at 51 with the upper rear end of the crank arm 49 and pivotally connected as at 52 to the upper rear end of a lever arm 37. A spring 53 is connected at one end to the pivot connection 51 and extends upwardly and forwardly of this connection and is secured as at 54 to the rear of the back wall 12. The spring 53 constantly urges the tine structure 33 to a lowered position. A chain or a flexible member 55 is connected at one end to the crank member 48 and extends rearwardly thereof and is wound about a drum 56, which is pivotally mounted on a shaft 57. The shaft 57 is journalled in a pair of vertically disposed bearing plates 58 and 59, which are secured to the plate 28. The plates 58 and 59 are adapted to extend above the frame structure 10 and the axle housing 11.

A drum operating lever 60 shown in greater detail in Figures 4 and 5, is rockably mounted on the shaft 57, and a pawl 61 is pivotally mounted on a pivot 62 engaging the lever 60. A pawl operating lever 63 is pivotally mounted as at 64 on the lever 60 adjacent the upper end thereof and a pair of rods 65 and 66 are pivotally connected at one end thereof to the lever 63 and the pawl 61, respectively. A contracting spring 67 is connected to the adjacent ends of the two rods 65 and 66 and is adapted to rock the pawl 61 downwardly to engage the teeth of a ratchet 68 which is fixed relative to the drum 56.

A stop pawl 69 is pivotally mounted on a pivot 70 carried by the plate 58, and a contracting spring 71 is connected at one end to the pawl 70 and at the other end to the plate 58 and is adapted to constantly urge the pawl 69 to a released position. A pair of link members or rods 72 and 73 are disposed in substantial alignment, and their adjacent ends are connected to the opposite ends of a stop pawl operating spring 74. The link member 72 is pivotally connected as at 75 to the stop pawl 69, and the link member 73 is provided at its upper end with an eye 76 which is mounted on a hook 77 carried by the lever 60. There are several of these hooks 77 on the lever 60, and the link member 73 may be engaged with a selected one of these hooks 77 so as to place the spring 74 under the desired tension. The lever 60 is adapted to be rocked forwardly and rearwardly after the manner of a pendulum and as the lever 60 rocks forwardly, the spring 74 will be expanded or placed under tension and the stop pawl 69 will be drawn thereby into engagement with the ratchet 68. The tension of this spring 74 is such that when the lever 60 is in the dotted line position, the tension of the spring 74 will serve as a means for yieldably swinging the lever 60 rearwardly.

The pawl operating lever 63 during the lowering of the sweep structure is released so that the lever 60 may freely swing back and forth and when the lever 60 is in its forward dotted line position, the weight of the lever 63 will gravitatingly swing the pawl 61 to a released position. At this time the stop pawl 69 will be in a ratchet engaging position as shown in Figure 4 so that until the lever 60 is swung rearwardly to the full line position shown in Figure 5, the drum 56 and the ratchet 68 will be held against rotation under the forward pull of the chain 55.

The entire sweep structure is raised or lowered independently of the position of the tine structure 33 relative to the back wall 12 by means of a flexible elevating and lowering member 78 which is wound about a drum 79 fixed to a winding shaft 80. The shaft 80 is journalled through a tubular bearing member 81 which is fixed as by a pair of U-bolts or other suitable fastening members 82 to an angle member 83 which is fixed by fastening devices 84 to one side of the frame 10. There are two of these angle members 83, one on each side of the frame 10. The shaft 80 projects beyond the ends of the bearing tube 81, and the shaft 80 is provided adjacent each end thereof with winding drums 85. A flexible member 86 is wound about each drum 85, one end of the flexible member 86 being fixed relative to the drum 85 and the other end of the flexible member 86 being connected to a plate 87 which is welded or otherwise secured to a push bar adjacent the forward end of the push bar. A pair of laterally projecting stop members 88 are fixed to the forward ends of the angle members 83 in a position to engage the bracing members 22 and 23 upon upward swinging movement of the push bars 19 and 20. The flexible member 78 is wound about a winding drum 89 which is journalled on the shaft 57 and the drum 89 is provided with a drum operating lever 90 having a pawl pivotally secured thereto engageable with a ratchet 91.

The drum structure 89 is similar in every detail to the drum structure 56 shown in Figures 4 and 5, and the description of the drum operating lever 60 and the parts associated therewith will apply equally as well to the drum structure 89 and the lever 90.

In the use and operation of this sweep rake, the tractor is moved forwardly with the tines 33 in a lowered position and as the tines 33 are engaged with the desired material such as hay, straw or the like, the tines 33 may be rocked upwardly on the pivot 45 by upward and rearward swinging movement of the lever 63. This forward swinging of the lever 63 will place the spring 67 under tension so as to yieldably hold the pawl 61 in engagement with the ratchet 68. The lever 60 with the lever 63 grasped in the hand, is then given a forward and rearward rocking movement so as to wind the flexible member 55 on the drum 56. Rearward pull on the flexible member 55 will swing the crank member 48 rearwardly and downwardly and coincidentally the crank arms 49 will be rocked downwardly, and both links 50 and the lever arm 37 will also be rocked downwardly.

When it is desired to raise the load on the tines 33, the entire sweep structure may be raised by rocking the elevating lever 90 in the same manner as the operation of the lever 60. During the elevating of the sweep structure by manual rocking of the lever 90, this lever is swung back and forth in a position whereby the stop pawl releasing spring 74 thereof will not release the stop pawl 69 at the end of the rear structure or movement of the lever 90.

In the event it is desired to lower the sweep structure with the load, the lever 90 is given a rearward swinging movement so that the pawl 61 will engage the ratchet 91 and the pawl 69 will be released by its releasing spring 71. The pull on the flexible member 78 will rotate the drum 89 in a clockwise movement and swing the lever 90 forwardly until the tension on the spring 74 is sufficient to pull the pawl 69 into engagement with the ratchet 91. At this time the pawl 61 is gravitatingly released from the ratchet 91 so that the tension of the spring 74 will swing the lever 90 rearwardly and this rearward and forward swing of the lever 90 will continue until the load on the tines 33 is lowered to the desired point.

In order to prevent side sway of the sweep rake I have provided a pair of steadying or guide arms 91a which are dependingly carried by a supporting bar 92 which is fixed to the supporting members 83 by fastening devices 93. The depending arms 91a are provided adjacent their upper ends with spaced holes 94 through a selected one of which a fastening member 95 engages so as to permit vertical adjustment of the arms 91a. Each arm 91a is provided at its lower end with a right angularly disposed and outwardly extending supporting foot 96 which engages beneath a push-bar 19 so as to limit the lowering of the push-bars 19. The inner edges of the bars 19 are adapted to slidingly engage the outer edges of the arms 91a so that the push-bars 19 will thereby be held against lateral swinging movement.

The depending arms 91a are braced against swinging movement by means of bracing members 97 which at one end thereof are secured to the horizontal supporting bar 92 by means of fastening devices 98 which engage in selected spaced openings 99 in the bar. The opposite or lower ends of the braces 97 are secured by fastening devices 100 which engage through selected holes 101 in the arms 91a.

What I claim is:

1. A sweep rake attachment for a tractor comprising a pair of push-bars disposed on opposite sides of and extending forwardly from the tractor, a supporting bracket member for each push-bar, means pivotally securing the rear end of a push-bar to a bracket member, means detachably securing said bracket members to the rear portion of the tractor, a bodily vertically shiftable upright wall member at the front of the tractor, means fixedly securing said wall member to the forward ends of said push-bars, a tine structure including a plurality of parallel tines, a pair of parallel bars connecting the rear portions of said tines together, a pair of levers fixed to said tine structure and including a lower arm fixed to said pair of parallel bars and an obtusely disposed upwardly and rearwardly directed arm, means pivotally securing said lower arms to the forward ends of said push-bars, a rock shaft rockably carried by said wall member, a pair of crank arms fixed to said shaft, a link pivotally connecting a crank arm with an upwardly and rearwardly directed arm, a shaft operating arm fixed to said shaft, means connected to said operating arm for rocking said shaft for adjusting the tine structure at an inclination, and means for elevating or lowering said push-bars at the forward ends thereof for bodily vertically shifting said wall member and tine structure in unison.

2. A sweep rake attachment for a tractor comprising a bodily vertically shiftable frame including an upright wall member arranged at the front of the tractor, a pair of supporting push-bars fixed to said member and extending rearwardly therefrom, means pivotally securing the rear ends of said push-bars on the tractor, a forwardly directed angularly adjustable tine structure at the bottom of said wall, means pivotally mounting said tine structure on said push-bars, a pair of rearwardly and upwardly inclined lever arms fixed to said tine structure, a rock shaft rotatably carried by said wall member, a pair of crank arms fixed to said shaft, links connecting said crank arms with said lever arms, an operating arm fixed to said shaft, a winding drum, a flexible member wound about said drum and connected to said operating arm for rocking said shaft to angularly adjust said tine structure, a drum operating lever, pawl and ratchet means engaging said drum and said operating lever, and means connecting to said push bars for bodily vertically shifting said frame and tine structure in unison.

3. A sweep rake attachment for a tractor comprising a swinging frame including an upright wall member, a pair of supporting push-bars fixed to said member and extending rearwardly therefrom, means pivotally securing the rear ends of said push-bars on the tractor, a tine structure, means pivotally mounting said tine structure on said push-bars, a pair of rearwardly and upwardly inclined lever arms fixed to said tine structure, a rock shaft rotatably carried by said wall member, a pair of crank arms fixed to said shaft, links connecting said crank arms with said lever arms, an operating arm fixed to said shaft, a winding drum, a flexible member wound about said drum and connected to said operating arm, a drum operating lever, a ratchet fixed relative to said drum, a stop pawl, means pivotally supporting said stop pawl for engagement with said ratchet, a spring constantly urging said stop pawl away from said ratchet, a second pawl pivotally carried by said operating lever, yieldable means connecting said stop pawl with said lever, an operating member for said second pawl pivotally carried by said operating lever, and yieldable means connecting said operating member with said second pawl.

4. A sweep rake attachment for a tractor comprising a vertically swingable frame including an upright wall member at the front of the tractor, a pair of push-bars fixed to said member and extending rearwardly therefrom, means pivotally securing the rear ends of said push-bars on the tractor, a tine structure at and extending forwardly from the bottom of said wall member, means pivotally mounting said tine structure on said push-bars, means for angularly adjusting said tine structure relative to said member, a rotatable frame elevating shaft, means rotatably mounting said shaft on the tractor, a pair of winding drums fixed to said shaft, a flexible member wound about each drum and connected to said push bars to thereby provide for the bodily vertically shifting of said frame and tine structure in unison on the rotation of said shaft, an intermediate drum fixed to said shaft between said pair of drums, a flexible member wound about said intermediate drum and extending rearwardly therefrom, a rear drum, means rotatably supporting said rear drum, said latter flexible member being also wound about said rear drum, an operating lever for said rear drum, and a spring pressed walking pawl and ratchet means engaging said operating lever.

5. A sweep rake attachment for a tractor comprising a vertically swingable frame including an upright wall member, a pair of push-bars fixed to said member and extending rearwardly therefrom, means pivotally securing the rear ends of said push-bars on the tractor, a tine structure, means pivotally mounting said tine structure on said push-bars, means for rocking said tine structure relative to said member, a frame elevating shaft, means rotatably mounting said shaft on the tractor, a pair of winding drums fixed to said shaft, a flexible member wound about each drum and connected to said push bars, an intermediate drum fixed to said shaft between said pair of drums, a flexible member wound about said intermediate drum and extending rearwardly therefrom, a rear drum, means rotatably supporting said rear drum, said latter flexible member being also wound about said rear drum, an operating lever for said rear drum, and a spring pressed walking pawl and ratchet means engaging said operating lever, said latter means including a ratchet fixed relative to said rear drum, a stop pawl, means pivotally supporting said stop pawl for engagement with said ratchet, a spring constantly urging said stop pawl away from said ratchet, a second pawl pivotally carried by said operating lever, yieldable means connecting said stop pawl with said operating lever, an operating member pivotally carried by said operating lever, and yieldable means connecting said operating means with said second pawl, gravitating swinging of said operating means away from said operating lever effecting release of said second pawl from said ratchet in one position of said operating lever.

6. A sweep rake attachment for tractors comprising a vertically swingable frame including an upright wall member disposed at the front of the tractor, a pair of push-bars fixed to said member and extending rearwardly therefrom, means pivotally securing the rear ends of said push-bars on the tractor, a tine structure, means pivotally mounting said tine structure on said push-bars in forwardly directed relation with respect to the bottom of said member, a swingable tine structure operating lever, a winch means operatively connected to said tine structure to effect an angular adjustment of said tine structure relative to said upright member, pawl and ratchet means engaging said operating lever and said winch means, a second winch means operatively connected to said push-bars to vertically rock said push-bars to thereby provide for the bodily vertical shifting of said frame and tine structure in unison on the operation of said second winch means, a second operating lever for said second winch means, and pawl and ratchet means engaging said second operating lever and said second winch means.

7. A sweep rake attachment for tractors comprising a vertically swingable frame including an upright wall member disposed at the front of the tractor, a pair of push-bars fixed to said member and extending rearwardly therefrom, means pivotally securing the rear ends of said push-bars on the tractor, a tine structure, means pivotally mounting said tine structure on said push-bars in forwardly directed relation with respect to the bottom of said member, a swingable tine structure operating lever, a winch means operatively connected to said tine structure to effect an angular adjustment of said tine structure relative to said upright member, pawl and ratchet means engaging said operating lever and said winch means, a second winch means operatively connected to said push-bars to vertically rock said push-bars to thereby provide for the bodily vertical shifting of said frame and tine structure in unison on the operation of said second winch means, a second operating lever for said second winch means, and pawl and ratchet means engaging said second operating lever and said second winch means, each of said pawl and ratchet means including means whereby downward pull on said push-bars adjacent the forward ends thereof and initial free swinging movement of said second operating lever will effect gradual lowering of said frame, push-bars and said tine structure.

8. A sweep rake attachment for a tractor comprising a swinging frame including an upright wall member disposed at the front of the tractor, a pair of supporting push-bars fixed to said member and extending rearwardly therefrom, means pivotally securing the rear ends of said push-bars on the tractor, depending push bar guide means fixed relative to the tractor and slidably engaging said push bars adjacent the forward ends thereof to thereby hold said push-bars against lateral movement, a tine structure at and directed forwardly from the bottom of said member, means pivotally mounting said tine structure on said push-bars, a pair of rearwardly and upwardly inclined lever arms fixed to said tine structure, a rock shaft rotatably carried by said wall member, a pair of crank arms fixed to said shaft and being resiliently connected to said frame, links connecting said crank arms with said lever arms, a shiftable operating arm fixed to said shaft to thereby provide on the rocking of said shaft the angular adjustment of said structure with respect to the lower end of said member, a winding drum, a flexible member wound about said drum and connected to said operating arm for shifting the latter to rock said shaft, a drum operating lever, and pawl and ratchet means engaging said drum and said operating lever.

9. A sweep rake attachment for a tractor comprising a swinging frame including an upright wall member disposed at the front of the tractor, a pair of supporting push-bars fixed to said member and extending rearwardly therefrom, means pivotally securing the rear ends of said push-bars on the tractor, depending push-bar guide means fixed relative to the tractor and slidably engaging said push-bars adjacent the forward ends thereof to thereby hold said push-bars against lateral movement, an outwardly extending foot carried by each of said guide means adjacent the lower end thereof and engageable with said push-bars upon downward swinging of the latter to limit the lowering of the push-bars, a tine structure at and directed forwardly from the bottom of said member, means pivotally mounting said tine structure on said push-bars, a pair of rearwardly and upwardly inclined lever arms fixed to said tine structure, a rock shaft rotatably carried by said wall member, a pair of crank arms fixed to said shaft and being resiliently connected to said frame, links connecting said crank arms with said lever arms, a shiftable operating arm fixed to said shaft to thereby provide on the rocking of said shaft the angular adjustment of said structure with respect to the bottom of said wall, a winding drum, a flexible member wound about said drum and connected to said operating arm for shifting the latter to rock said shaft, a drum operating lever, and pawl and ratchet means engaging said drum and said operating lever.

10. A sweep rake attachment for tractors comprising a swinging frame including an upright wall member, said frame being disposed in advance and extending laterally in opposite directions with respect to the front of the tractor, an angularly adjustable tine structure arranged below and directed forwardly from the bottom of said frame, a pair of forwardly extending supporting push bars arranged on opposite sides of the engine of the tractor and fixed to said frame, means for pivotally suspending the rear terminal portions of said push bars from the axle housing of the tractor, means for pivotally mounting said tine structure on the forward terminal portions of said bars, shiftable means for angularly adjusting the tine structure relative to the bottom of said upright wall member, said shiftable means being rockably mounted in and releasably connected to said frame and having parts supported from said axle housing, and shiftable means for bodily vertically shifting said frame and structure in unison, said second shiftable means being connected to said bars in proximity to said frame, disposed rearwardly of the latter, supported from said axle housing and from the sides of said engine.

EMRICH WEISHAAR.